United States Patent Office 2,785,638
Patented Mar. 19, 1957

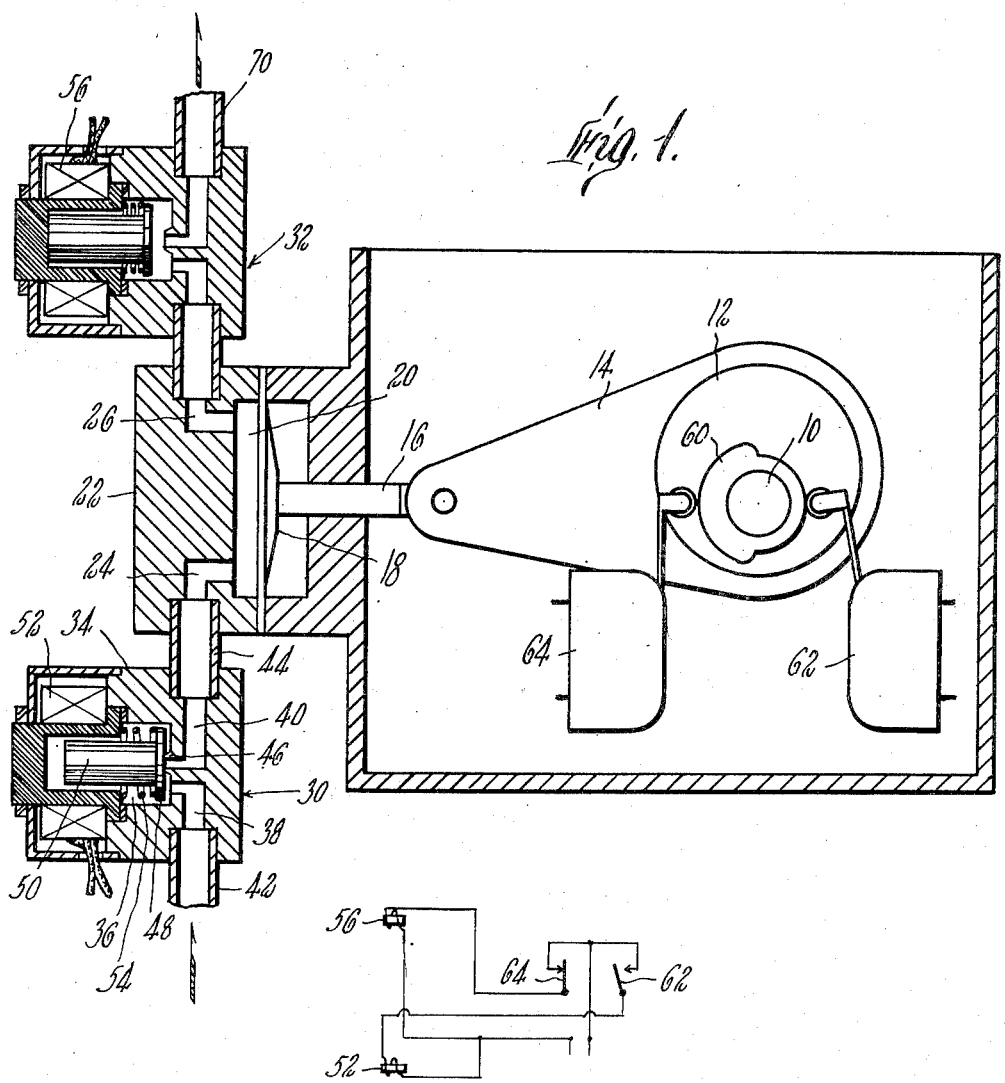

2,785,638

FORCE PUMP FOR SLURRIES

Clifford B. Moller, Cambridge, Mass.

Application April 8, 1954, Serial No. 421,756

2 Claims. (Cl. 103—150)

This invention relates to a force pump particularly designed for pumping slurries, that is, relatively concentrated suspensions of fine solids which tend to settle out rapidly. Suspensions of this kind tend to clog the check valves of an ordinary force pump so that the pump soon becomes ineffective. It is an object of the present invention to provide a pump having a reciprocatory impeller and a check valve on the suction side of the pump which is forcefully actuated so that the valve chamber is scoured by the action of the valve and the settling of suspended solid particles in the suspension which is being pumped is prevented to a sufficient extent to keep the valve operatively clear. According to the invention, the check valve in the suction line of a pump is provided with actuating means which is independent of the suction usually relied on to open such valve. A similarly operated check valve may also be employed in the discharge line from the pump. In the example illustrated on the drawing an electric solenoid is provided to open each valve, a strong spring being employed to shut it. For a more complete understanding of the invention reference may be had to the following description thereof and to the drawing, of which—

Figure 1 is a diagrammatic representation of pump mechanism embodying thte invention; and Figure 2 is a wiring diagram for the apparatus shown in Figure 1.

The pump mechanism indicated on the drawing comprises a shaft 10 to be driven by a motor (not shown). Mounted on the shaft is an eccentric 12 which turns in an eccentric strap 14 to reciprocate a rod 16 to which a pump diaphragm 18 is secured. The diaphragm is in an enclosed chamber 20 and as it is reciprocated it alternately draws fluid in and forces fluid from the chamber. The chamber is enclosed in a housing 22 through which an inlet duct 24 and an outlet duct 26 lead to the chamber 20. Check valves 30 and 32 are connected respectively with the ducts 24 and 26.

The valve assembly 30 which is in the suction line comprises a casing 34 enclosing a chamber 36 communicating with two ducts 38 and 40. The duct 38 is connected by a suitable tube or pipe 42 to a source of fluid which is to be pumped. The duct 40 is connected by a suitable tube or pipe 44 to the duct 24 in the housing 22. Around the orifice of the duct 40 in the chamber 36 is a circular ridge 46 which is a seat for a disk valve 48. This valve is mounted on the end of an armature 50 of a solenoid 52, this armature being of relatively substantial volume so that it displaces considerable fluid in the valve chamber. A compressed spring 54 of suitable strength presses the valve disk 48 against its seat except when the valve is retracted by energization of the solenoid 52. As illustrated on the drawing the valve assembly 32 is identical in structure with the valve assembly 30, hereinbefore described, and includes a solenoid 56. However, since this valve is in the discharge line 26, power operation is not essential. An ordinary check valve can usually be employed, the valve element being lifted by the positive pressure of the fluid delivered by the pump.

Mounted on the shaft 10 is a cam member 60 which operates two micro-switches 62 and 64, these switches being connected respectively with the solenoids 52 and 56, as indicated in Figure 2. The switches are so related to the cam member 60 that at each half-revolution of the shaft 10, one switch opens and the other closes. Thus when the eccentric starts to retract the diaphragm 18, the valve 30 opens and the valve 32 closes. At the end of the stroke of the eccentric rod 16 the valves change, the valve 30 closing and the valve 32 opening. The reverse stroke of the rod which pushes the diaphragm outward forces the fluid up through the valve 32 to a delivery pipe 70. The quick, strong movements of the valve members 48 as they open and close the valves 30 and 32 and the movements of the relatively bulky armatures 50 within the valve chambers keep the contents of the valve chambers stirred up so that any solid particles which settle out are resuspended and no accumulation of sediment in the valve chambers is permitted.

I claim:

1. A force pump for pumping liquids containing thick suspensions of solid particles, comprising a housing enclosing a chamber with an inlet and an outlet, a diaphragm extending across said chamber and reciprocable to draw fluid into and expel fluid from said chamber, a check valve assembly connected to said inlet, said check valve including a valve seat, a valve member movable to and from said seat, a strong spring pressing said valve member toward its seat, and a solenoid energizable to retract said valve member away from its seat against the pressure of said spring, a check valve in said outlet, means for reciprocating said diaphragm, said last named means including a rotatable shaft, an eccentric mounted on said shaft, an eccentric strap on said eccentric, and a rod connecting said diaphragm to said strap, an electric switch mounted near said shaft, an electric circuit including said switch and said solenoid, and cam means rotatable with said shaft to close said circuit when said diaphragm begins its suction stroke and to open said circuit when the diaphragm begins its discharge stroke.

2. Apparatus as in claim 1, said inlet check valve assembly including a casing with an inlet and an outlet, said valve member comprising a disk normally seated on said outlet and a stem of substantial volume serving as an armature for said solenoid.

References Cited in the file of this patent

UNITED STATES PATENTS

| | | |
|---|---|---|
| 337,803 | Worth | Mar. 9, 1886 |
| 457,762 | Dittmar | Aug. 11, 1891 |
| 1,599,899 | Kettering | Sept. 14, 1926 |